United States Patent [19]

Hirt

[11] Patent Number: 4,513,637
[45] Date of Patent: Apr. 30, 1985

[54] GEARING ASSEMBLY

[75] Inventor: Manfred Hirt, Augsburg, Fed. Rep. of Germany

[73] Assignee: Zahnraderfabrik Renk A.G., Augsburg, Fed. Rep. of Germany

[21] Appl. No.: 382,772

[22] Filed: May 27, 1982

[30] Foreign Application Priority Data

May 30, 1981 [DE] Fed. Rep. of Germany ....... 3221662

[51] Int. Cl.³ .......................... F16H 1/28; F16H 57/00
[52] U.S. Cl. ........................................ 74/801; 74/410; 74/768; 74/785; 29/159.2
[58] Field of Search ................. 74/785, 788, 801, 797, 74/768, 769, 409, 410, 411; 29/445, 159.2, 33 K

[56] References Cited

U.S. PATENT DOCUMENTS

| 1,470,947 | 10/1923 | Tyler | 74/801 |
| 1,632,543 | 6/1927 | Fletcher, Jr. et al. | 29/159.2 |
| 3,008,355 | 11/1961 | Grudin | 74/785 |
| 3,015,973 | 1/1962 | Doerries | 74/785 X |
| 3,213,713 | 10/1965 | Sagara | 74/801 |
| 3,381,548 | 5/1968 | Wolkenstein | 74/801 |
| 3,473,416 | 10/1969 | Pope et al. | 74/801 |
| 3,633,441 | 1/1972 | Hicks | 74/410 X |
| 3,988,942 | 11/1976 | Greiner | 29/159.2 X |

FOREIGN PATENT DOCUMENTS

| 1227749 | 10/1966 | Fed. Rep. of Germany . | |
| 1450711 | 4/1969 | Fed. Rep. of Germany | 74/801 |
| 2607636 | 10/1980 | Fed. Rep. of Germany . | |
| 2002488 | 2/1979 | United Kingdom | 74/801 |
| 2031109 | 4/1980 | United Kingdom | 74/410 |

OTHER PUBLICATIONS

Brochure No. 9015 of Mssrs. BHS.

Primary Examiner—Allan D. Herrmann
Assistant Examiner—Arthur T. Quiray
Attorney, Agent, or Firm—Natter & Natter

[57] ABSTRACT

A high speed gearing assembly includes at least two interengaged composite gears having spur or single helical teeth. Each of the gears is formed of three annular gear parts which rotate about a common axis. The gear parts are juxtaposed in side by side relationship. The central part of each gear is offset relative to its adjacent end parts approximately one half a pitch length. Each end part is approximately one half the width of the central part. With a ratio of tooth engagement length to circular pitch length, i.e. the degree of overlap, of approximately 1.5, increased load capacity, steady running and reduced noise levels are attained.

11 Claims, 1 Drawing Figure

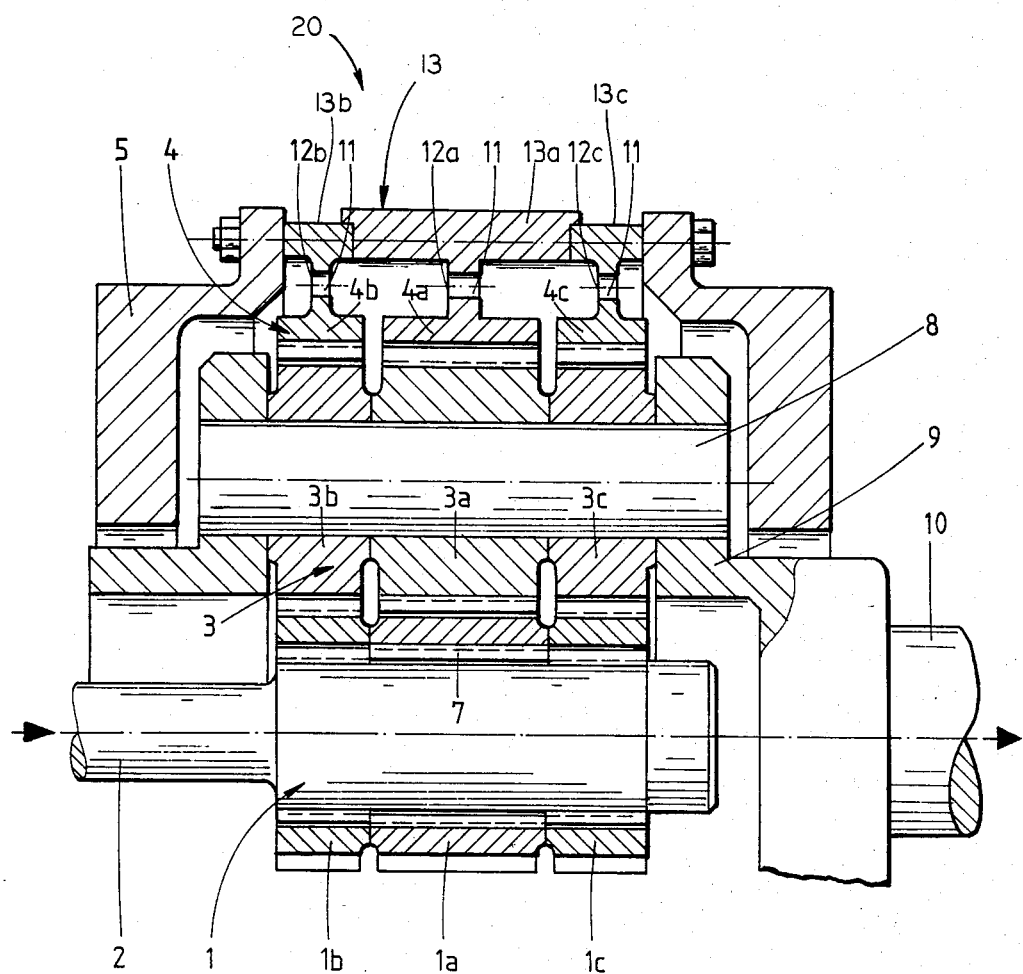

GEARING ASSEMBLY

TECHNICAL FIELD

The present invention relates generally to power transmission gearing systems and in particular to a gearing assembly which provides smooth, high speed operation.

BACKGROUND ART

In the past, gearing systems have employed composite gears wherein various annular gear parts are arranged coaxially in side by side relationship. For example, such gearing assembly is disclosed in the Federal Republic of Germany Pat. No. 26 07 636 issued Oct. 23, 1980 and assigned to the assignee of the present invention. Gearing of this type permitted coolant to flow off at the sides of each of the gear parts, thereby providing uniform temperatures across the width of the gear teeth.

This approach at temperature control left much to be desired in terms of noise reduction, load capacities and tooth damage under loads. The potential for such damage limited the load capacity of the gearing system. In order to provide reduced noise levels and increased load capacities, prior gear assemblies included costly double helical gearings.

DISCLOSURE OF THE INVENTION

In compendium, the present invention comprises a gearing assembly formed of at least two interengaged straight spur or single helical gears. Each gear is formed of a central gear part and two end parts which are arranged coaxially with and adjacent to the central part. The teeth of the central part are displaced approximately one half a circular pitch length from the teeth of the end parts, and the ratio of tooth engagement length at the pitch circle to the circular pitch length is approximately 1.5.

Load distribution between the gear parts is achieved by the displacement of the central gear part, the degree of overlap and the extended width of the displaced central part. Constant uniform stiffness over the entire width of each tooth is thus provided, while at the same time noise levels are reduced.

From the foregoing compendium, it will be appreciated that it is a feature of the present invention to provide a gearing assembly which is not subject to the disadvantages of the background art aforementioned.

A further aspect of the present invention is to provide a gearing assembly of the general character described which provides uniform load distribution through composite gears.

Yet a further feature of the present invention is to provide a gearing assembly of the general character described which is constructed for increased gear tooth life.

A further feature of the present invention is to provide a gearing assembly of the general character described which is capable of facilitating effective temperature control.

Yet a further aspect of the present invention is to provide a gearing assembly of the general character descibed which is capable of increased load capacity yet is low in cost.

A still further feature of the present invention is to provide a high speed gearing assembly of the general character described which is capable of smooth steady running at high load levels.

Other aspects and features of the present invention in part will be obvious and in part will be pointed out hereinafter.

With these ends in view, the invention finds embodiment in certain combinations of elements and arrangements of parts by which the said features and objects and certain other features and objects are hereinafter attained, all with reference to the accompanying drawing and the scope of which is more particularly pointed out and indicated in the appended claims.

BRIEF DESCRIPTION OF THE DRAWING

The drawing comprises a longitudinal fragmentary sectional view through a high speed gearing assembly constructed in accordance with and embodying the present invention with portions of the gearing assembly deleted and other portions broken away for clarity.

BEST MODE FOR CARRYING OUT THE INVENTION

For a more definitive understanding of the invention and the following description thereof, the following terms employed herein should be construed as including the following definitions:

CIRCULAR PITCH—The distance on the pitch circle from a point of one tooth to the corresponding point on the adjacent tooth, measured along the length of the arc of the pitch circle.

DEGREE OF OVERLAP—The ratio of the length of the rotational path travelled from the beginning to the end of the engagement of a tooth to the circular pitch length, i.e. engagement length/circular pitch length.

Referring now in detail to the drawings, the reference numeral 20 denotes generally a gearing assembly constructed in accordance with and embodying the present invention. The gearing assembly 20 is shown in exemplary manner as comprising a planetary gear train for turbine installations which optimizes the steady, quiet running attributes of the present gear system in a high speed environment.

The gearing assembly 20 is driven by a turbine output shaft 2 which engages a composite sun gear 1. The sun gear 1, in turn, drives a plurality of planet gears, each denoted generally by the reference numeral 3, which also engage an annular internal ring gear denoted generally by the reference numeral 4. The ring gear 4 is stationary and fixed to a casing or shroud 5. Each of the planet gears 3 is rotatably mounted to a bearing pin 8 which is, in turn, mounted to a cage or carrier 9. An output shaft 10 is secured to the cage 9.

In accordance with the invention, the sun gear 1, the planet gears 3 and the ring gear 4 are constructed as composite gears having either spur or single helical teeth. Accordingly, the sun gear 1 is comprised of a central annular gear part 1a, a left end part 1b and a right end part 1c both on opposite sides of the central part. The end parts 1b and 1c are preferably of equal width, while the central part 1a is of a width corresponding to the sum of the widths of the end parts 1b and 1c.

As can be observed from the drawing, the three sun gear parts are driven by a plurality of gear teeth 7 formed on the turbine output shaft 2 and therefore include internal gears for such engagement. The central gear part 1a of the sun gear is rotated relative to the end parts 1b and 1c a fraction of a circular pitch length, preferably one half a circular pitch length. The gear parts 1b and 1c may be rotated relative to the central part 1a either in the same direction or in opposite directions.

Similarly, each planet gear 3 is a composite gear formed of three gear parts, a central part 3a, a left end part 3b and a right end part 3c. Each of the planet gear parts is of a width corresponding to that of the parts of the sun gear 1 meshing therewith. It should be understood that each of the planet gear parts 3a, 3b and 3c is independently rotatable on its bearing pin 8.

As previously mentioned, the composite planet gears 3 also engage an annular internal ring gear 4. The ring gear 4 is formed of three annular gear parts, a central gear part 4a, a left end part 4b and a right end part 4c. Each of the ring gear parts 4a, 4b and 4c is connected to a stationary outer ring part 13a, 13b and 13c respectively through a narrow annular web 12a, 12b and 12c respectively. The webs 12a, 12b and 12c include a plurality of openings 11. The ring gear 4 is mounted to the stationary casing or shroud 5 by being attached thereto at the end ring parts 13b and 13c.

The annular webs 12a, 12b and 12c are relatively thin in cross section and the openings 11 serve to provide a flexible resilient interconnection between the gear parts 4a, 4b, 4c and the housing or shroud 5 to thereby dampen any residual vibration or unsteadiness.

As illustrated in the drawing, each of the annular ring gear parts may be formed in one piece with its outer ring part and its annular web. Alternately, the three annular gear segments 4a, 4b, 4c may be formed of a separate piece and the webs welded or otherwise secured to the outer face of the ring gear parts. The distal periphery of each annular web is secured to the interior face of its outer ring part by welding.

In an alternate construction, the outer ring part and the web of each ring gear part may be formed of a single piece which is welded or otherwise joined to the outer periphery of each ring gear part.

It should be appreciated that a principal aspect of the invention resides in the division of each gear in a step fashion with an angular displacement between the teeth of the central part as compared to the teeth of the end parts. The rotation of the central part relative to the outer or end parts is preferably one half the circular pitch length of each composite gear. If a degree of overlap is chosen in the order of 1.5, a substantially constant uniform stiffness over the entire width of each tooth is achieved, this results in the steady quiet running of the gear assembly 20. The relative rotation of the various gear parts of each composite gear with respect to a central gear part may be in the same direction of displacement or in opposite directions of displacement.

Preferably, the teeth of all of the gear parts of each composite gear are cut together and rotated relative to each other only during assembly. As a result, manufacturing tolerances and inaccuracies caused by such tolerances between the various parts of a composite gear will be avoided. This enhances the steady quiet gearing engagement of the gearing assembly.

The teeth of each composite gear may be cut from a single elongate gear blank and the elongate gear thereafter cut along an axis perpendicular to its axis of rotation to provide the three gear parts. Alternately, the three gear part blanks may be secured together as by clamping and the composite gear cut. In either instance, conventional gear cutting techniques such as milling, hobbing, generating or the Fellows method are employed.

It should be appreciated that with each of the parts of the composite gears being rotated relative to its adjacent segment by a fraction of the circular pitch length, and with the central parts being of a width equal to the sum of the widths of the end parts, different tooth engagements are provided simultaneously over the gear width of the composite gear. This results in the steadier, quieter running under high load capacities and relieves load strain at the tips of gear teeth thereby increasing load capacity and reducing the potential for galling damage.

Thus, it will be seen that there is provided a high speed gearing assembly which achieves the various features and aspects of the present invention and which is well suited to meet the conditions of practical usage.

As various modifications might be made in the invention as above set forth, it is to be understood that all matter herein described or shown in the accompanying drawings is to be interpreted as illustrative and not in a limiting sense.

Having thus described the invention, what is claimed as new and desired to be secured by Letters Patent is:

1. A gearing assembly comprising a plurality of composite gears in interengagement, each composite gear including three gear parts and means coupling the gear parts about an axis for unitary rotation, the coupling means of one of the composite gears including means nonrotationally fixing each gear part to an axial shaft, means independently rotatably mounting each gear part of the other composite gear to an axial shaft, the coupling means of the other composite gear comprising the toothed interengagement of the composite gears, the gear parts being arranged symmetrically along the axis of each composite gear, each part of each composite gear having a diameter, the diameter of each part of each composite gear being the same, each part of each composite gear having a number of gear teeth, the number and shape of all the gear teeth of each part of each composite gear being the same, a central gear part of each composite gear being twice the width of adjacent gear parts, each gear part of each composite gear being rotated relative to each adjoining gear part a distance less than a circular pitch length.

2. A gear assembly constructed in accordance with claim 1 wherein each composite gear includes spur teeth.

3. A gear assembly constructed in accordance with claim 1 wherein each composite gear includes single helical teeth.

4. A gear assembly constructed in accordance with claim 1 wherein axially adjacent gear parts are rotated relative to each other a distance of one half of a circular pitch length.

5. A gear assembly constructed in accordance with claim 1 wherein the gearing assembly comprises a planetary gear train, the other composite gear comprising a planet gear.

6. A planetary gear train constructed in accordance with claim 5 wherein one of the composite gears comprises an annular ring gear, the planetary gear train further including a stationary outer ring and resilient means for maintaining the ring gear stationary, the resilient means including relatively thin annular webs extending integrally from each of the gear parts of the ring gear to the outer ring and being integral with the outer ring.

7. A planetary gear train constructed in accordance with claim 6 wherein the relatively thin annular webs include means forming apertures therethrough whereby increased flexibility is provided for enhanced vibration damping.

8. A gear assembly constructed in accordance with claim 1 wherein the teeth of the composite gears are in mutual interengagement, the mutual tooth engagement including a degree of overlap, the degree of overlap of mutually interengaged composite gears being in the order of 1.5.

9. A method of constructing a composite gear assembly comprising a plurality of gear parts of equal diameter, number of teeth and shape of teeth, the method comprising the steps of (a) unitarily cutting the teeth of the composite gear and
(b) subsequently rotating adjacent gear parts relative to one another.

10. The method of claim 9 wherein the gear parts are formed from separate blanks, the method comprising the step of (c) securing the separate blanks together in axial registry prior to cutting the teeth.

11. The method of claim 9 wherein the gear parts are formed from a single blank, the method further including the step of separating the cut gear blank into gear parts along planes perpendicular to the composite gear axis prior to rotating adjacent gear parts.

* * * * *